(12) United States Patent
Kim

(10) Patent No.: US 7,093,352 B2
(45) Date of Patent: Aug. 22, 2006

(54) APPARATUS FOR ASSEMBLING SWASH PLATE WITH PISTONS IN A SWASH PLATE COMPRESSOR

(75) Inventor: Kiyeon Kim, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 328 days.

(21) Appl. No.: 10/773,732

(22) Filed: Feb. 5, 2004

(65) Prior Publication Data

US 2004/0159231 A1 Aug. 19, 2004

(30) Foreign Application Priority Data

Feb. 6, 2003 (KR) ...................... 10-2003-0007534

(51) Int. Cl.
*B23P 21/00* (2006.01)
*B23P 15/00* (2006.01)

(52) U.S. Cl. ........................ 29/771; 29/888.02; 29/822; 29/785

(58) Field of Classification Search .................. 29/771, 29/785, 786, 791, 792, 793, 822, 823, 888.02, 29/281.1, 281.5
See application file for complete search history.

(56) References Cited

U.S. PATENT DOCUMENTS

| 5,369,878 | A | 12/1994 | Tsuji et al. |
| 6,038,767 | A | 3/2000 | Ito |
| 6,343,540 | B1 * | 2/2002 | Ota et al. .................. 29/281.5 |
| 6,453,546 | B1 | 9/2002 | Kennicott et al. |

FOREIGN PATENT DOCUMENTS

EP 0 853 199 7/1998

* cited by examiner

*Primary Examiner*—David P. Bryant
(74) *Attorney, Agent, or Firm*—Bachman & LaPointe, P.C.

(57) ABSTRACT

An apparatus for assembling a swash plate with pistons in a swash plate compressor of the present invention can automatically assemble the swash plate with double or single head pistons and shoes thereby improving workability and productivity. In the assembling apparatus, each of the pistons includes a swash plate-receiving section for receiving a pair of opposed shoes therein and having an insert groove for receiving the swash plate mounted on a rotational shaft and a piston body to be inserted into a cylinder bore of a cylinder block so that the swash plate is inserted into the insert grooves of the pistons. The assembling apparatus comprises a base plate, piston-loading means, piston-shifting means and rotating means.

15 Claims, 10 Drawing Sheets

APPARATUS FOR ASSEMBLING SWASH PLATE WITH PISTONS IN A SWASH PLATE COMPRESSOR

BACKGROUND OF THE INVENTION

1. Field of the Invention

The present invention relates to an apparatus for assembling a swash plate with pistons in a swash plate compressor. In particular, the apparatus for assembling a swash plate with pistons in a swash plate compressor of the present invention can automatically assemble the swash plate with double or single head pistons and shoes thereby improving workability and productivity.

2. Background of the Related Art

In general, a compressor in a vehicle cooling system selectively receives power from an engine through a vehicle pulley in response to engagement/disengagment of an electronic clutch in order to suck in refrigerant which is heat exchanged in an evaporator, compress the refrigerant with a piston and discharge the compressed refrigerant to a condenser.

Compressors are divided into various forms such as reciprocating and rotary compressors according to their compression policy and structure. Reciprocating compressors are further divided into crank, swash plate and wobble plate compressors. Rotary compressors are further divided into vane rotary and scroll compressors.

In the above various compressors, the swash plate compressor can be generally divided into fixed and variable capacity compressors, in which the fixed capacity compressor uses double head pistons, and the variable capacity compressor uses single head pistons.

Hereinafter the fixed capacity compressor and the variable capacity compressor will be described briefly with reference to FIGS. 1 and 2.

First, as shown in FIG. 1, a fixed capacity compressor includes a front housing 4 having a front cylinder 4a integrally formed within the front housing 4, a rear housing 5 coupled in face-contact with the front housing 4 and having a rear cylinder 5a integrally formed within the rear housing 5, a plurality of double head pistons 6 arranged in a linearly reciprocating fashion in bores 4b of the front cylinder 4a and bores 5b of the rear cylinder 5a, a drive shaft 7 arranged in a rotatable fashion through central portions of the front and rear cylinders 4a and 5a of the front and rear housings 4 and 5, a swash plate 8 mounted at an inclination on the drive shaft 7 so that it is turned in response to rotation of the drive shaft 7 to move the pistons 6 forward and backward and front and rear valve switches 9 arranged respectively between the front cylinder 4a and the front housing 4 and between the rear cylinder 5a and the rear housing 5.

The reference numeral 6a designates a shoe.

Then, as shown in FIG. 2, a variable capacity swash plate compressor includes a cylinder block 10, a front housing 20, a rear housing 30, single head pistons 40, a drive shaft 50, a rotor 60, a swash plate 70, a valve unit 80 and a control valve 90.

The cylinder block 10 has a central bore 11 and a plurality of cylinder bores 12 extended through the cylinder block 10. The cylinder bores 12 are formed radially around the central bore 11 at a uniform interval.

The front and rear housings 20 and 30 are arranged respectively in front and rear ends of the cylinder block 10 so that three components of the front and rear housings 20 and 30 and the cylinder bock 10 are coupled into one part via an elongate bolt 21.

Each of the single head pistons 40 is slidably arranged within each of the cylinder bores 12, and has a body 41 and a bridge portion 42.

The drive shaft 50 is extended rotatably through a central portion of a front wall of the front housing 20 and a crank chamber 22 formed within the front housing 20 so that a rear end of the drive shaft 50 being supported rotatably to a central portion of the cylinder block 10.

The cylinder block 10 together with the front housing 20 defines an internal space, which is in a hermetic state to be used as the crank chamber 20.

The rotor 60 is mounted around the drive shaft 50 in a front portion of the crank chamber 22 to be turned in response to rotation of the drive shaft 50.

The swash plate 70 is installed in a central portion of the crank chamber 22 in such a fashion that it can be adjusted in inclination around the drive shaft 50. In more detail, the swash plate 70 and the rotor 60 are connected via a hinge mechanism to be turned together with the same.

That is, a support arm 61 is projected from a surface portion of the rotor 60 outward along the drive shaft 50, and a swash plate arm 71 is projected from a surface portion of the swash plate 70 toward the support arm 61 of the rotor 60. The support arm 61 is connected with the swash plate arm 71 via a pin 62.

A portion of the outer periphery of the swash plate 70 is rotatably inserted into the bridge portion 42 of the single head piston 40.

As connected with the rotor 60 and the bridge portion 42 of the single head piston 40, the swash plate 70 can be turned not only along with the rotor 60 at rotation by the drive shaft 50 but also forward and backward around the pin 62 in response to the internal pressure of the crank chamber 22 so that the inclination of the swash plate 70 can be adjusted.

In the meantime, the valve unit 80 is arranged between the cylinder block 10 and the rear housing 30 to regulate intake and discharge of refrigerant.

A prior art for assembling the double head piston 6 or the single head piston 40 to the swash plate 8 or 70 as shown in FIGS. 1 and 2 is disclosed in Korean Patent Application Publication No.1999-0064088.

According to the prior art, when the pair of shoes are mounted on notch of the pistons with spherical surfaces of the shoes being laid toward bottoms of the notch, and a slide table loaded with the pistons is moved toward the swash plate, the spherical surfaces of the shoes are vertically rotated through the right and left outside the notch while flat surfaces of the shoes are contacted with both sides of the periphery of the swash plate so that the pistons together with the shoes are mounted on the swash plate. As a result, there is a problem that an additional pressing member is used to ensure a space so that a peripheral portion of the swash plate is inserted between the shoes before the pistons are assembled to the swash plate.

Although the assembling process of the prior art is completed when the spherical surfaces of the shoes are vertically rotated through the right and left outside the notch and at the same time flat surfaces of the shoes are contacted with both sides of the periphery of the swash plate, there is a problem that the shoes are frequently shifted in positions during being pressed by the pressing member and erroneously assembled to the swash plate thereby lowering assembly rate.

Since the prior art tightens center bolts installed in a center stand to fix both ends of a rotational shaft or uses center pins provided in a support head in order to fix the swash plate at a predetermined angle, there is another problem that an apparatus is complicated.

Furthermore, according to the prior art, both heads of the pistons assembled to the swash plate are supported by two piston supports or piston supports of the two support heads. Then, there is also a problem that the apparatus is complicated.

SUMMARY OF THE INVENTION

The present invention has been made to solve the foregoing problems.

It is therefore an object of the present invention to provide an apparatus for assembling a swash plate with pistons in a swash plate compressor capable of automatically assembling double or single head pistons and shoes to the swash plate in order to improve workability and productivity.

According to an aspect of the present invention, there is provided an apparatus for assembling a swash plate with pistons in a swash plate compressor, wherein each of the pistons includes a swash plate-receiving section for receiving a pair of opposed shoes therein and having an insert groove for receiving the swash plate mounted on a rotational shaft and a piston body to be inserted into a cylinder bore of a cylinder block so that the swash plate is inserted into the insert grooves of the pistons, the apparatus comprising: a base plate; piston-loading means for loading the pistons to be lined up in a longitudinal direction; piston-shifting means arranged slidably on the base plate for shifting the pistons loaded by the piston-loading means in order; and rotating means for rotating the swash plate so that the pistons shifted by the piston-shifting means are assembled to the swash plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Hereinafter a preferred embodiment of an apparatus for assembling a swash plate with pistons in a swash plate compressor will be described with reference to the accompanying drawings.

Figure 1:
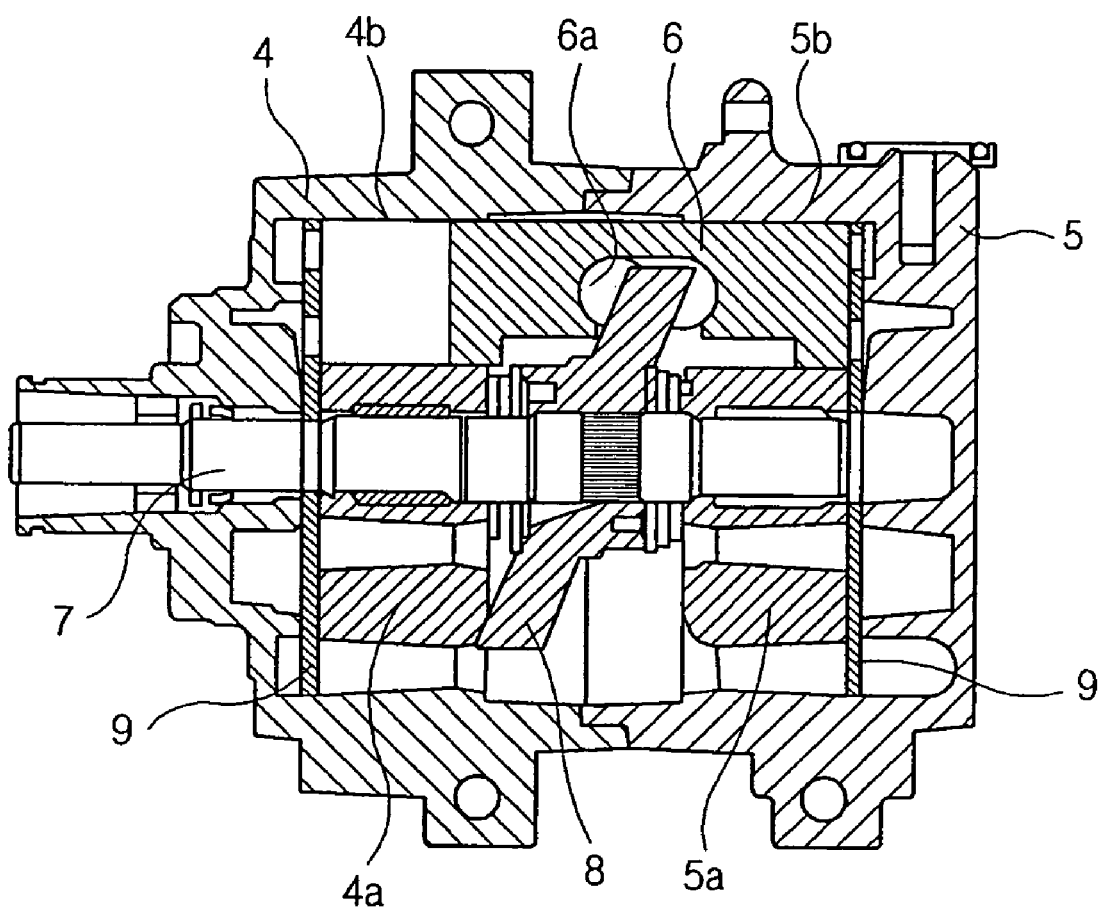
FIGS. 1 and 2 are sectional views illustrating internal structures of conventional swash plate compressors.
Figure 2:
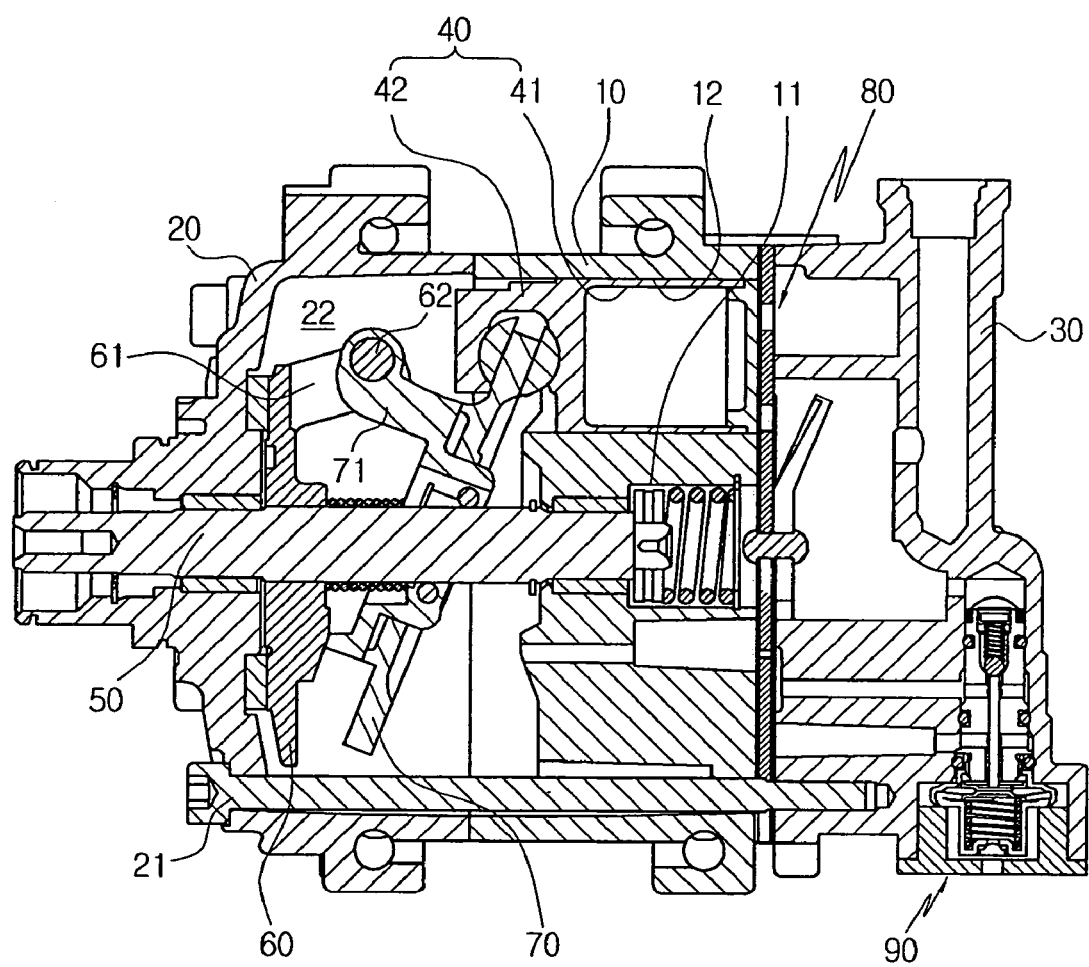
Figure 3:
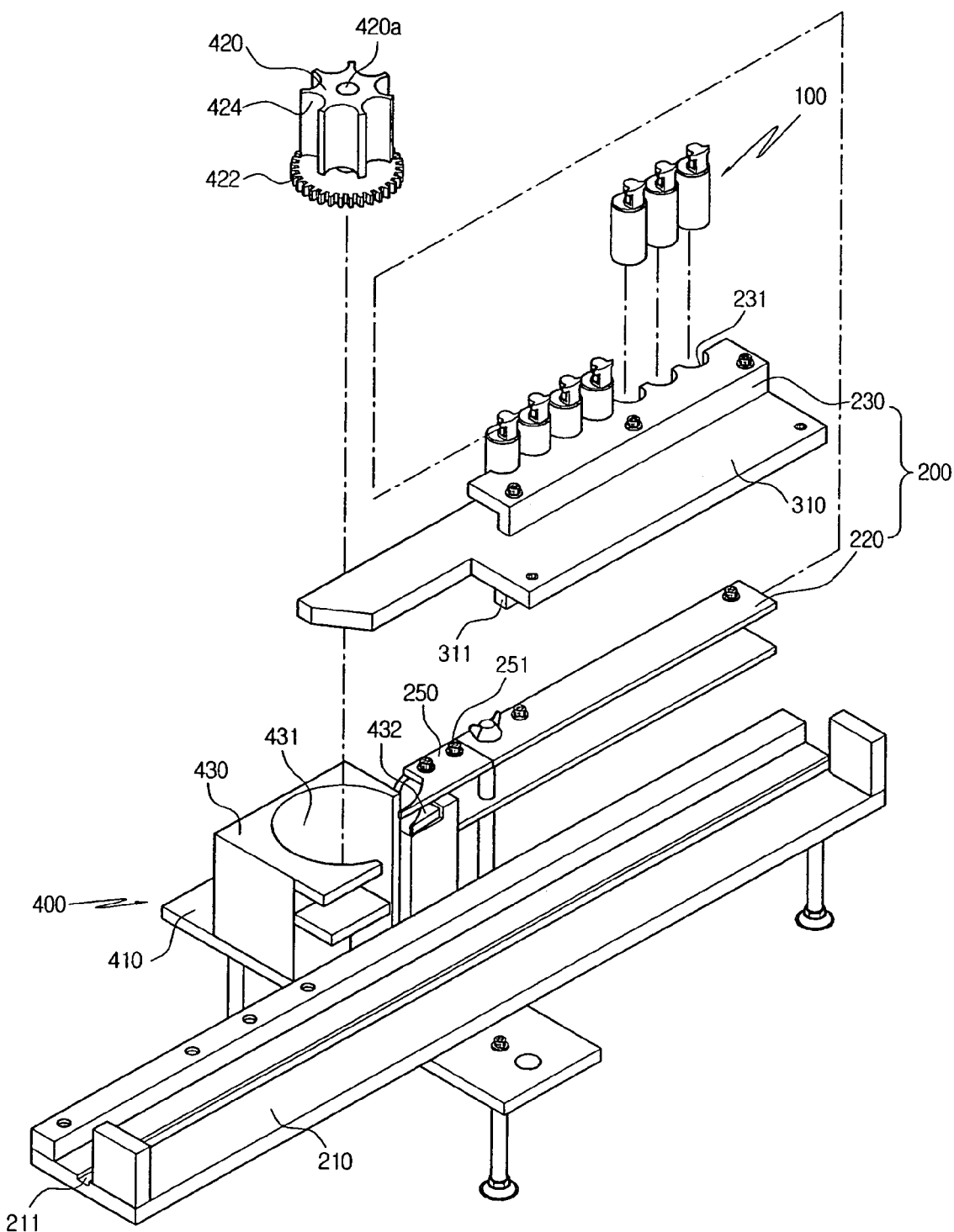
FIG. 3 is an exploded perspective view of an assembling apparatus of the present invention.
Figure 4:
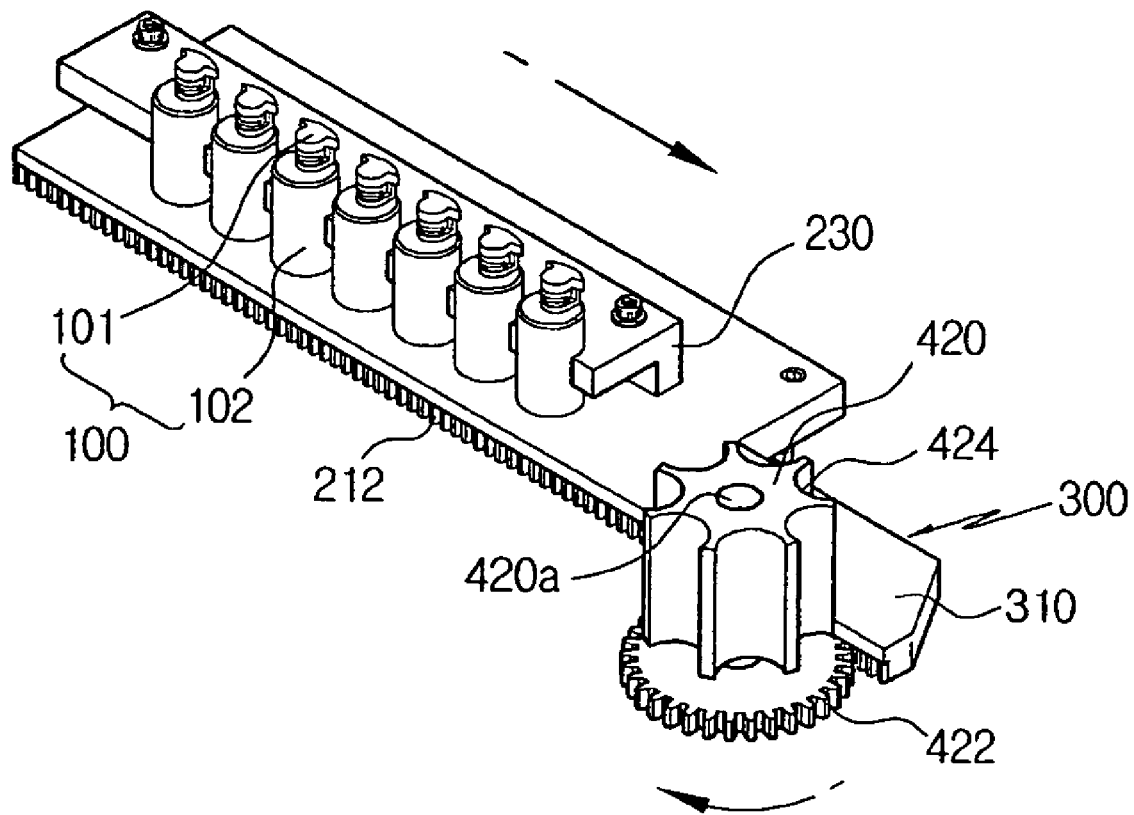
FIG. 4 is a partial perspective view illustrating a pinion and a rack meshed with each other according to the present invention.
Figure 5:
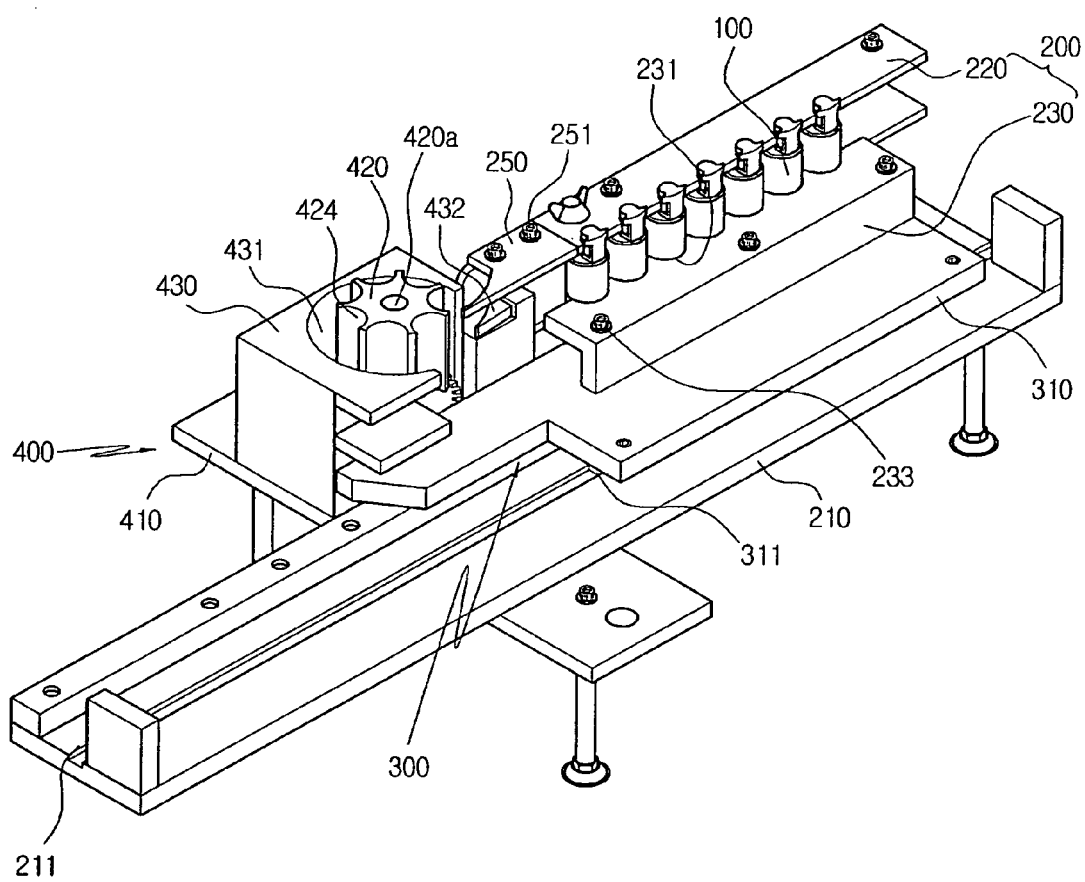
FIG. 5 is an assembled perspective view of the assembling apparatus of the present invention.
Figure 6:
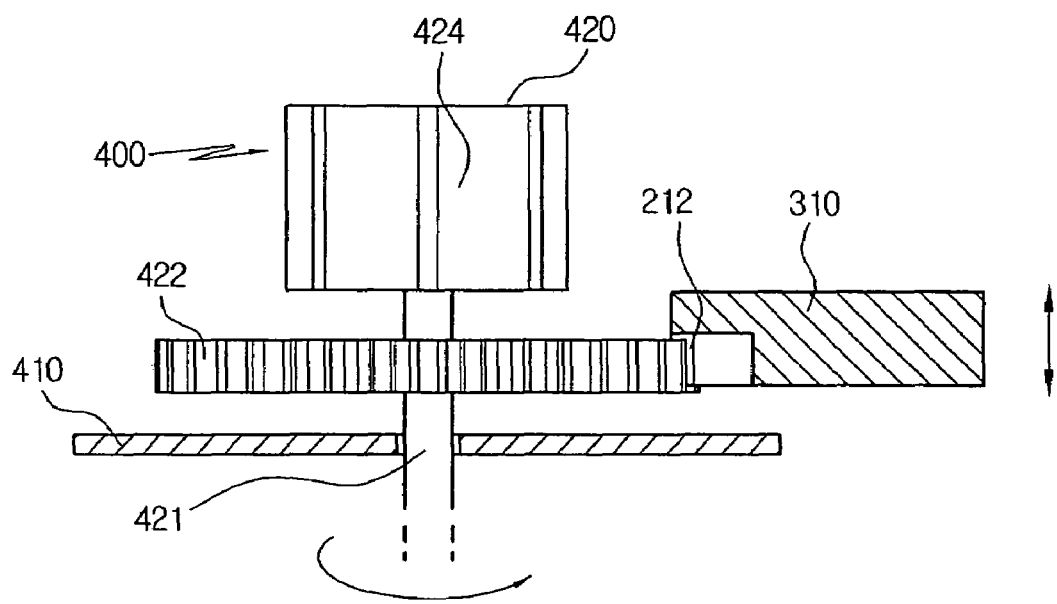
FIG. 6 is a partial sectional view illustrating the pinion and the rack meshed with each other according to the present invention.
Figure 7:
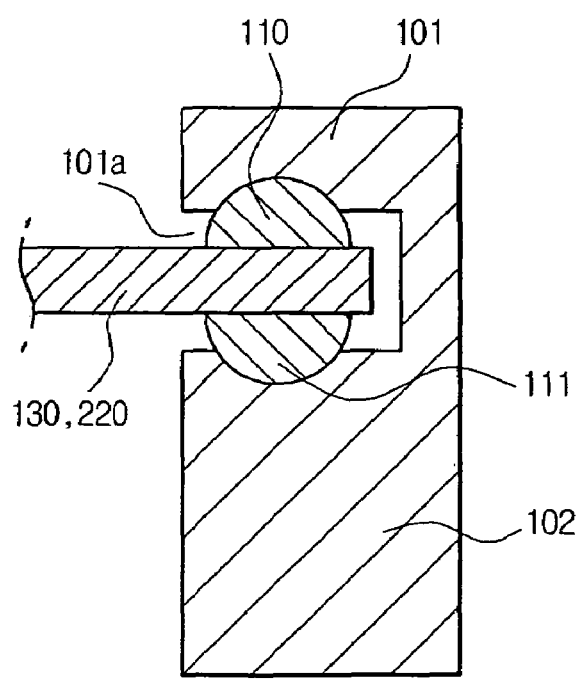
FIG. 7 is a sectional view illustrating a stationary guide member introduced into an insert groove of a piston according to the present invention.
Figure 8:
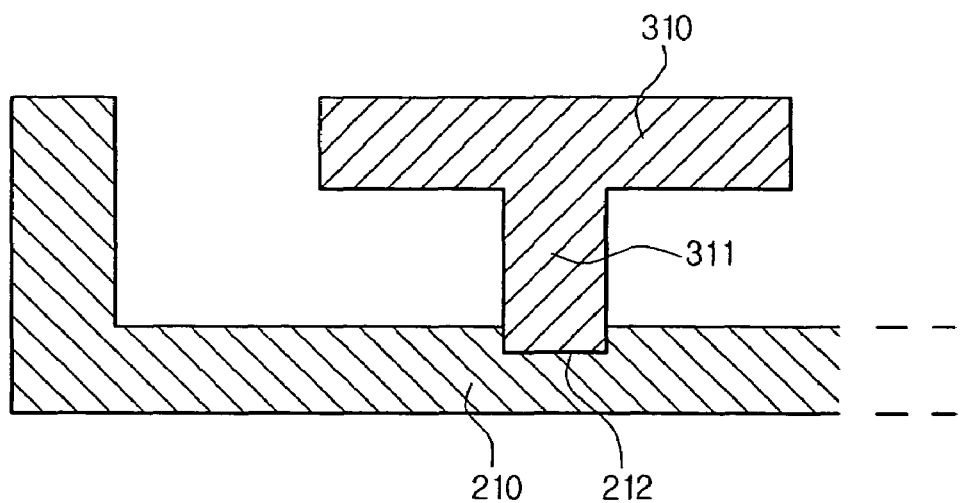
FIG. 8 is a sectional view illustrating a transport plate coupled with a base plate according to the present invention.
Figure 9:
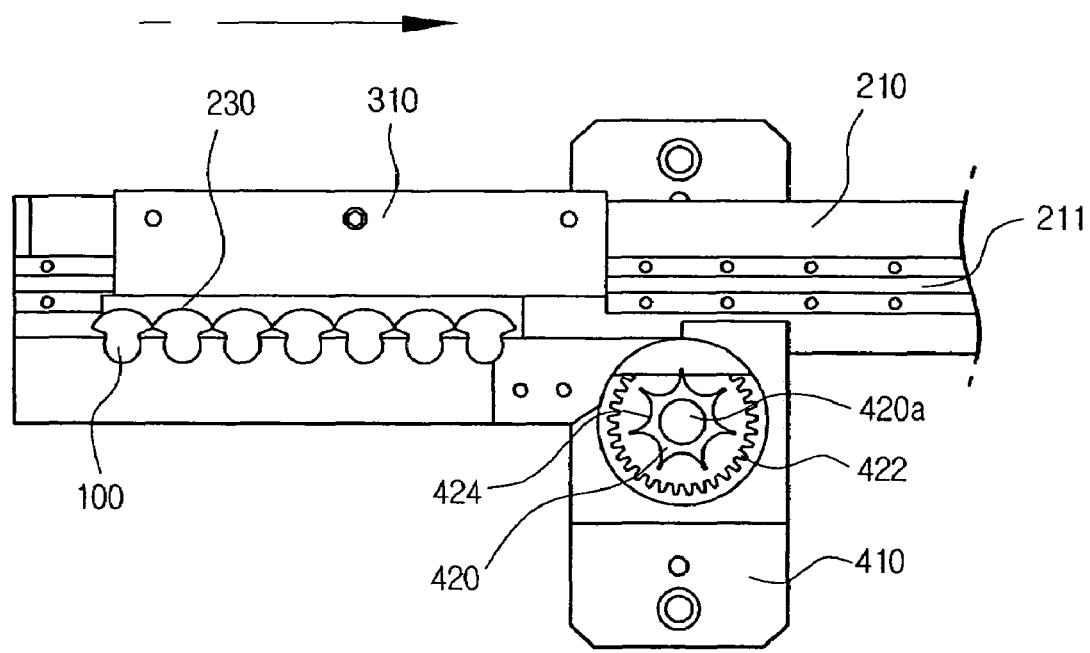
FIG. 9 is a plan view of FIG. 5.
Figure 11:
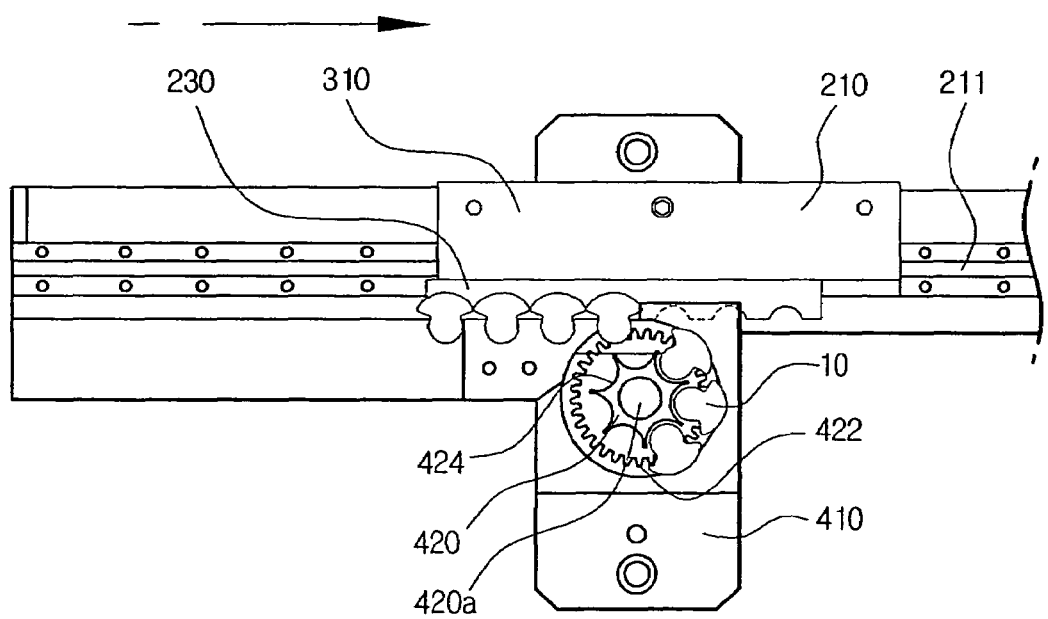
Figure 12:
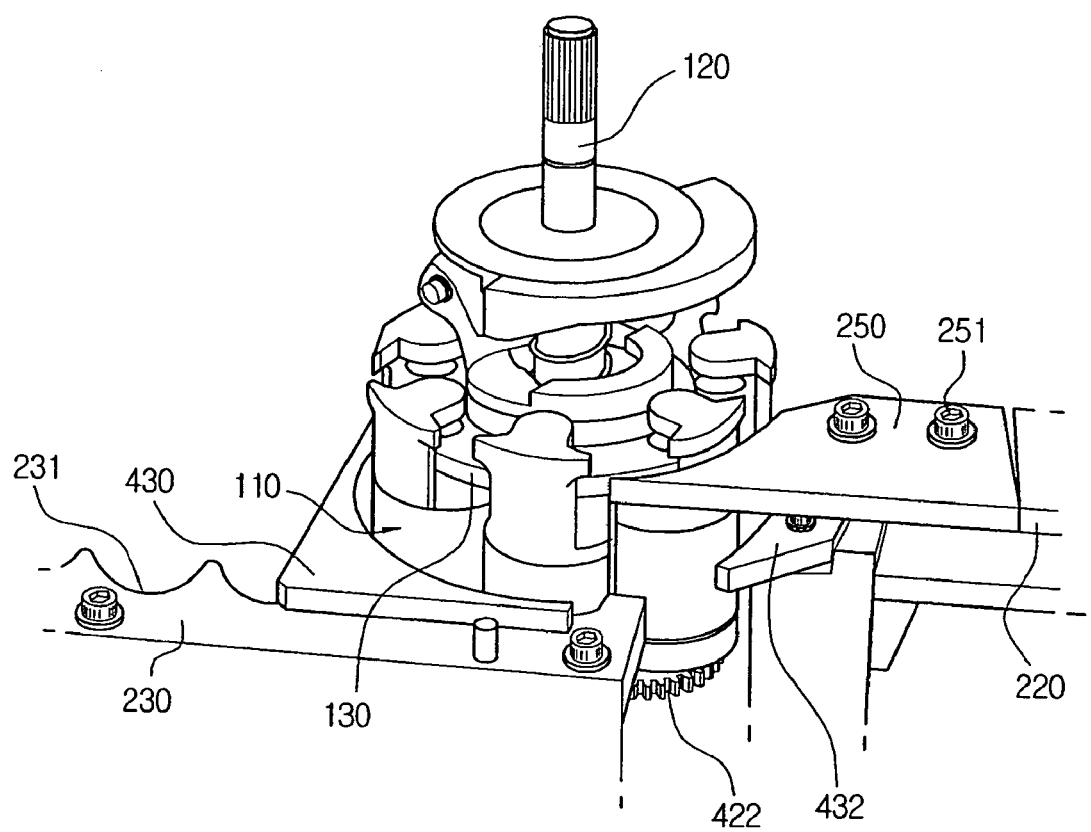
Figure 13:
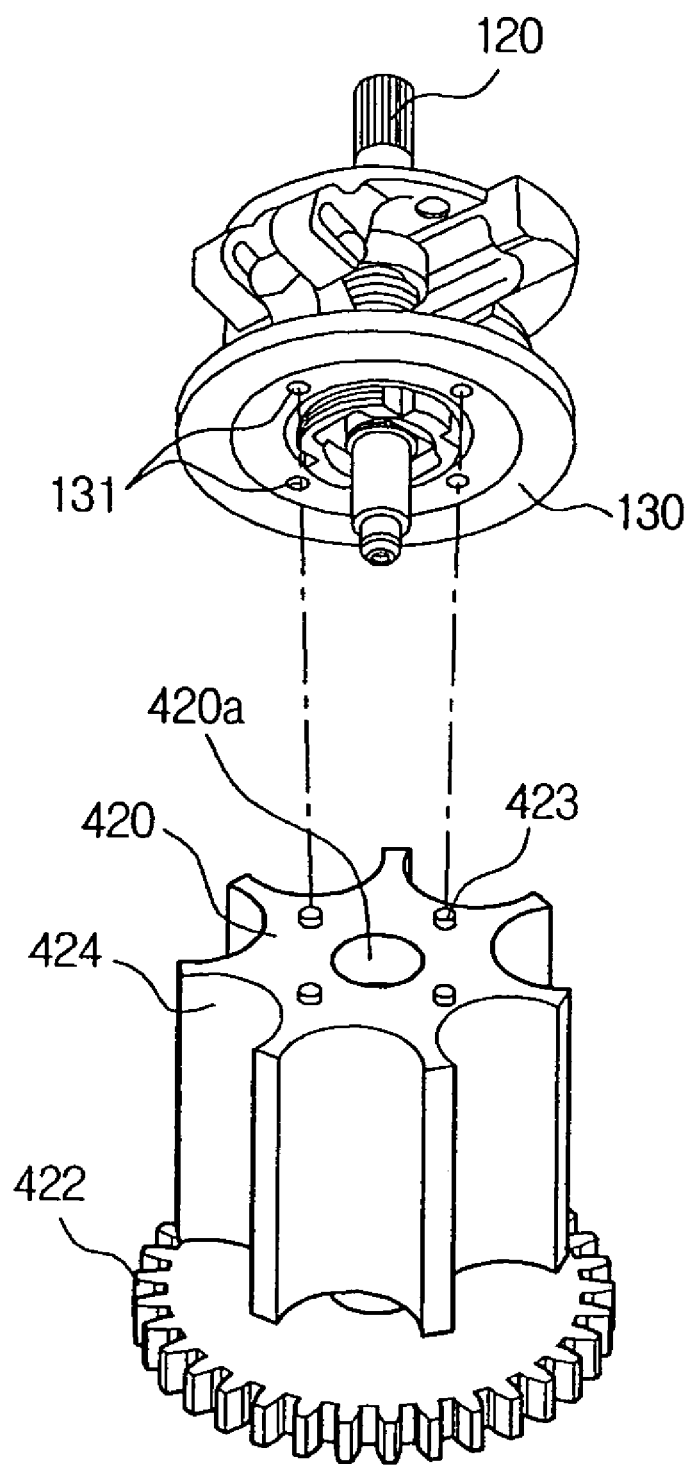
FIG. 13 illustrates an alternative embodiment of the present invention.

FIG. 3 is an exploded perspective view of an assembling apparatus of the present invention, FIG. 4 is a partial perspective view illustrating a pinion and a rack meshed with each other according to the present invention, FIG. 5 is an assembled perspective view of the assembling apparatus of the present invention, FIG. 6 is a partial sectional view illustrating the pinion and the rack meshed with each other according to the present invention, FIG. 7 is a sectional view illustrating a stationary guide member introduced into an insert groove of a piston according to the present invention, FIG. 8 is a sectional view illustrating a transport plate coupled with a base plate according to the present invention, FIG. 9 is a plan view of FIG. 5, FIGS. 10 to 12 illustrate a process of assembling pistons to a swash plate according to the present invention, and FIG. 13 illustrates an alternative embodiment of the present invention.

The present invention relates to an apparatus for assembling a swash plate 130 with pistons 100 in a swash plate compressor, in which each of the pistons 100 includes a swash plate-receiving section 101 for receiving a pair of opposed shoes 110 and 111 therein and having an insert groove 101a for receiving the swash plate 130 mounted on a rotational shaft 120 and a piston body 102 to be inserted into a cylinder bore of a cylinder block so that the swash plate 130 is inserted into the insert grooves 101a of the pistons 100. The assembling apparatus of the present invention includes piston-loading means 200 for loading the pistons 100 to be lined up in a vertically erected position, piston-shifting means 300 for shifting the pistons 100 loaded by the piston-loading means 200 in order and rotating means 400 for rotating the swash plate 130 so that the pistons 100 shifted by the piston-shifting means 300 are assembled to the swash plate 130.

The piston-loading means 200 includes a base plate 210, a stationary guide member 220 and a piston-loading member 230.

The base plate 210 is spaced to a predetermined height from a working table.

The stationary guide member 220 is fixed to the base plate 210 to guide the pistons 100 in a line, in which the stationary guide member 220 is fixedly arranged in the base plate 210 for guiding the pistons 100 to be lined up, and inserted into the insert grooves 101a of the pistons 100 with the shoes 110 and 111 contained in the insert grooves 101a in such a fashion that its top and underside are contacted with the shoes 110 and 111.

The stationary guide member 200 is placed in a horizontal position, and the pistons 100 are loaded in vertical positions.

When loading the pistons 100 guided by the stationary guide member 220, the piston-loading member 230 spaces the pistons 100 to a predetermined gap.

The piston-loading member 230 has a number of loading grooves 231 into which bodies 102 of the pistons 100 are partially inserted.

In the meantime, the piston-shifting means 300 has a transport plate 310 which is arranged slidable with respect to the base plate 210, and supports bottoms of the bodies 102 of the pistons 100 guided by the stationary guide member 220.

Describing a coupling construction of the piston-shifting means 300 and the base plate 210, a guide groove 211 is formed longitudinally in an upper surface of the base plate 210 and an insert portion 311 is formed in the bottom of the transport plate 310 so that it can be inserted into and slid along the guide groove 211.

Herein, the piston-loading member 230 is detachably coupled with the transport plate 310 via fastening bolts 233.

In the meantime, the rotating means 400 includes an auxiliary plate 410 and a movable guide member 420.

The auxiliary plate 410 is spaced to a predetermined height from the working table.

A lower end of the rotational shaft 120 is fixedly inserted in part into an upper central portion of the movable guide member 420, and a shaft portion 421 is projected from a lower central portion of the movable guide member 420 and rotatably extended through the auxiliary plate 410. The movable guide member 420 cooperates with the piston-shifting means 300 to rotate the swash plate 130 together with the rotational shaft 120. When the swash plate 130 is inserted into the insertion grooves 101a of the pistons 100, the movable guide member 420 receives the bodies 102 of the pistons 100 at least in part to guide the same.

The movable guide member 420 has a plurality of piston-receiving grooves 424 in the outer periphery thereof for receiving the bodies 102 of the pistons 100 in part.

The reference numeral 420a designates an insert hole into which the rotational shaft 120 of the swash plate 130 is inserted.

On the top of the auxiliary plate 410, there is also provided a block 430 which is opened in an upper end and a lateral portion for allowing the pistons 100 to be introduced. The block 430 also has a space 431 for surrounding the movable guide member 420.

A pinion 422 is formed around the shaft portion 421 of the movable guide member 420, and a rack 212 is formed in the transport plate 310 to mesh with the pinion 422.

The pistons 100 illustrated so far are single head pistons used in a variable capacity compressor.

Hereinafter a process of assembling a swash plate with pistons using the assembling apparatus of the present invention will be described.

First, a predetermined number of the pistons 110 for example seven pistons 110 in the embodiment of the present invention, as shown in FIGS. 5 and 9, are supplied to the stationary guide member 220 so that the shoes 110 are 111 are grasped by upper and lower surfaces of the stationary guide member 220 as shown in FIG. 7, in which the stationary guide member 220 is introduced into the insert groove 101a while the upper and lower surfaces of the stationary guide member 220 are contacted with the shoes 110 and 111, and then the process of the present invention is carried out.

Since the pistons 100 are loaded on the stationary guide member 220 by grasping the shoes 110 and 111 of the pistons 100 with the upper and lower surfaces of the stationary member 220, the assembling apparatus does not need any additional pressing member for ensuring a space for insertion of a swash plate prior to assembling the pistons with the swash plate. This simplifies the structure of the assembling apparatus of the present invention.

Figure 10:
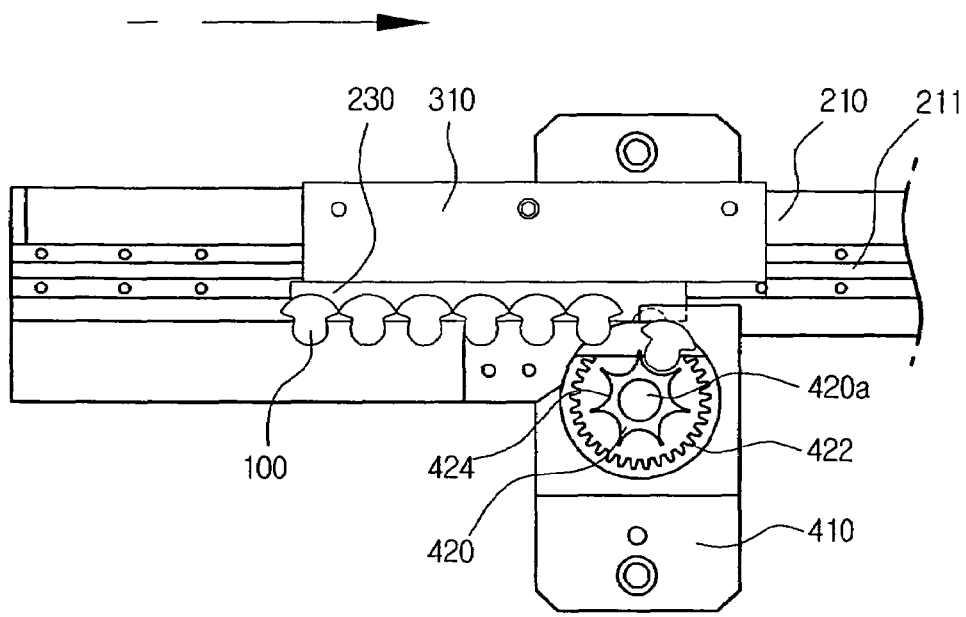
FIGS. 10 to 12 illustrate a process of assembling pistons to a swash plate according to the present invention.

After the above procedure, when an external force is applied to the transport plate 310 along an arrow, the transport plate 310 is slid with respect to the base plate 210 shifting the piston-loading member 230 along with the pistons 100 as shown in FIG. 10.

When the transport plate 310 is moved, the movable guide member 420 is rotated as shown in FIG. 4.

That is, as shown in FIG. 10, the first one of the pistons 100 is coupled with the swash plate 130 in response to rotation of the movable guide member 420.

Continuing the above procedure, two or three of the pistons 100 are coupled with the swash plate 130 as shown in FIG. 11, and all of the seven pistons 100 are finally coupled with the swash plate 130 as shown in FIG. 12.

As described above, as the swash plate 130 is positioned horizontal by inserting only the lower end of the rotational shaft 120 into the upper surface of the movable guide member 420, the assembly apparatus of the present invention does not need any additional means such as a center stand having two separate center bolts or two center pins which are used in the prior art to fix the swash plate at a specific angle. This can simplify the structure of the assembling apparatus of the present invention.

Also, because the pistons 100 together with the shoes 110 and 111 are directly coupled with the swash plate 130 via the stationary guide member 220 collinear with the swash plate 130, the assembling apparatus of the present invention can prevent or reduce probability that the pistons are erroneously assembled.

Then, the rotational shaft 120 coupled with the swash plate 130, which is loaded with all of the seven pistons 100, is drawn from the movable guide member 420 by an operator, so that the pistons 100 are inserted into cylinder bores of a cylinder block.

In the meantime, the stationary guide member 220 may further include an anti-release member 432 provided under an end portion thereof as shown in FIG. 12. When the pistons 100 assembled to the swash plate 130 are passed through the opened portion of the block 430, the stationary guide member 220 serves to guide the pistons 100 as well as prevent release of the pistons 100 from the swash plate 130.

Also as shown in FIG. 12, at an end portion of the stationary guide member 220, there is also provided a separating member 250 which is formed separate from the guide member 220 and coupled with the same via additional fastening bolts 251. When the swash plate 130 assembled with all of the pistons 100 is separated from the movable guide member 420, the separating member 250 is detached from the stationary guide member 220 so that the separating member 250 may not prevent separation of the swash plate 130.

The separating member 250 is provided collinear with the swash plate 130, which is placed on the movable guide member 420, in order to guide the pistons 100 and the shoes 110 and 111 to be stably coupled with the swash plate 130.

Further, as shown in FIG. 13, a plurality of fixing pins 423 are formed in the top of the movable guide member 420 and pin-receiving grooves 131 are formed in the bottom of the swash plate 130 to receive the fixing pins 423 so that the swash plate 130 maintain a certain direction.

While the present invention has been described on the basis that the pistons are supplied vertically to be assembled, it is to be understood that the afore-described apparatus can be simply modified in design so that the pistons can be supplied horizontally to be assembled.

Also, while the present invention has been illustrated about the single head pistons used in the variable capacity compressor, it is apparent that the present invention can be applied to the double head compressor used in the fixed capacity compressor.

As set forth above, the present invention allows the double or single head pistons and the shoes to be assembled to the swash plate thereby improving workability and productivity.

Also, the present invention can rapidly and readily assemble a suitable number of the pistons and the shoes to the swash plate by contacting the upper and lower surfaces of the stationary guide member with the shoes, thereby simplifying the assembling apparatus.

Further, the present invention has advantages that the pistons can be assembled to the swash plate without supporting both ends and productivity can be improved.

There are further advantages of excellent applicability and universality since the assembling apparatus of the present invention can be modified easily according to the modification in design of the pistons or the swash plate or the compressor type.

Moreover, according to the present invention, the pistons can be easily assembled to the swash plate since it is not necessary to set the swash plate at a specific angle during assembling operation.

What is claimed is:

1. An apparatus for assembling a swash plate with pistons in a swash plate compressor, wherein each of the pistons includes a swash plate-receiving section for receiving a pair of opposed shoes therein and having an insert groove for receiving the swash plate mounted on a rotational shaft and a piston body to be inserted into a cylinder bore of a cylinder block so that the swash plate is inserted into the insert grooves of the pistons, the apparatus comprising:
   a base plate;
   a piston-loading means for loading the pistons to be lined up in a longitudinal direction;
   a piston-shifting means arranged slidably on the base plate for shifting position of the pistons loaded by the piston-loading means in order; and
   a rotating means for rotating the swash plate so that the pistons shifted by the piston-shifting means are assembled to the swash plate.

2. The apparatus for assembling a swash plate with pistons in a swash plate compressor according to claim 1, wherein the piston-loading means comprising:
   a stationary guide member fixedly arranged in the base plate for guiding the pistons to be lined up, the stationary guide member being inserted into the insert grooves of the pistons with the shoes accomodated in the insert grooves in such a fashion that its top and bottom are contacted with the shoes; and
   a piston-loading member for loading the pistons guided by the stationary guide member to a predetermined spaced gap.

3. The apparatus for assembling a swash plate with pistons in a swash plate compressor according to claim 2, wherein the piston-loading member has a plurality of loading grooves into which bodies of the pistons are inserted partially.

4. The apparatus for assembling a swash plate with pistons in a swash plate compressor according to claim 2, wherein the piston-shifting means is a transport plate which is arranged slidable with respect to the base plate, and supports undersides of the bodies of the pistons.

5. The apparatus for assembling a swash plate with pistons in a swash plate compressor according to claim 4, wherein the piston-loading member is detachably coupled with the transport plate.

6. The apparatus for assembling a swash plate with pistons in a swash plate compressor according to claim 4, wherein a guide groove is formed longitudinally in an upper surface of the base plate and an insert portion is formed in an underside of the transport plate, wherein the insert portion is inserted into and slid along the guide groove.

7. The apparatus for assembling a swash plate with pistons in a swash plate compressor according to claim 1, wherein the piston-shifting means is a transport plate which is arranged slidable with respect to the base plate, and supports undersides of the bodies of the pistons.

8. The apparatus for assembling a swash plate with pistons in a swash plate compressor according to claim 7, wherein a guide groove is formed longitudinally in an upper surface of the base plate and an insert portion is formed in an underside of the transport plate, wherein the insert portion is inserted into and slid along the guide groove.

9. The apparatus for assembling a swash plate with pistons in a swash plate compressor according to claim 1, wherein the rotating means comprising:
   an auxiliary plate; and
   a movable guide member having an upper central portion, into which a lower end of the rotational shaft is fixedly inserted in part, and a shaft portion projected from a lower central portion thereof and rotatably extended through the auxiliary plate, wherein the movable guide member cooperates with the piston-shifting means to rotate the swash plate together with the rotational shaft, and when the swash plate is inserted into the insertion grooves of the pistons, receives the bodies of the pistons at least in part to guide the same.

10. The apparatus for assembling a swash plate with pistons in a swash plate compressor according to claim 9, wherein a plurality of fixing pins are formed in a top of the movable guide member and pin-receiving grooves are formed in an underside of the swash plate for receiving the fixing pins so that the swash plate maintain a certain direction.

11. The apparatus for assembling a swash plate with pistons in a swash plate compressor according to claim 9, further comprising a block having an opened upper end, an opened lateral portion for allowing the pistons to be introduced and a space for surrounding the movable guide member.

12. The apparatus for assembling a swash plate with pistons in a swash plate compressor according to claim 11, further comprising an anti-release member provided in the piston-loading means for guiding the pistons while preventing release of the pistons from the swash plate when the pistons assembled to the swash plate are passed through the opened portion of the block.

13. The apparatus for assembling a swash plate with pistons in a swash plate compressor according to claim 9, wherein a pinion is formed around the shaft portion, and wherein a rack is formed in the piston-shifting means to mesh with the pinion.

14. The apparatus for assembling a swash plate with pistons in a swash plate compressor according to claim 1, wherein the pistons are single head pistons.

15. The apparatus for assembling a swash plate with pistons in a swash plate compressor according to claim 1, wherein the pistons are loaded on the piston-loading means in a vertically erected position.

* * * * *